(12) United States Patent
Duckworth

(10) Patent No.: US 10,611,533 B2
(45) Date of Patent: Apr. 7, 2020

(54) VACUUM WINE BOTTLE STOPPER AND CAP, AND METHOD OF USE

(71) Applicant: David Glenn Duckworth, Irvine, CA (US)

(72) Inventor: David Glenn Duckworth, Irvine, CA (US)

(*) Notice: Subject to any disclaimer, the term of this patent is extended or adjusted under 35 U.S.C. 154(b) by 208 days.

(21) Appl. No.: 15/840,641

(22) Filed: Dec. 13, 2017

(65) Prior Publication Data

US 2019/0177053 A1 Jun. 13, 2019

(51) Int. Cl.
| | | |
|---|---|---|
| *B65D 51/18* | (2006.01) | |
| *B65D 39/00* | (2006.01) | |
| *B65D 51/24* | (2006.01) | |
| *B65D 81/20* | (2006.01) | |
| *C12H 1/16* | (2006.01) | |
| *B65D 81/36* | (2006.01) | |

(52) U.S. Cl.
CPC ......... *B65D 51/18* (2013.01); *B65D 39/0076* (2013.01); *B65D 51/245* (2013.01); *B65D 81/2038* (2013.01); *C12H 1/16* (2013.01); *B65D 81/366* (2013.01); *B65D 2251/0015* (2013.01); *B65D 2251/0043* (2013.01)

(58) Field of Classification Search
CPC .. B65D 51/18; B65D 51/245; B65D 81/2038; B65D 81/366; B65D 39/0076; B65D 2251/0015; B65D 2251/0043
See application file for complete search history.

(56) References Cited

U.S. PATENT DOCUMENTS

| | | | | |
|---|---|---|---|---|
| 3,009,594 A | | 11/1961 | Anson | |
| 4,763,803 A | * | 8/1988 | Schneider | B65D 51/165 215/260 |
| 4,989,745 A | * | 2/1991 | Schneider | B65D 79/005 116/270 |
| 5,031,785 A | * | 7/1991 | Lemme | B65B 31/047 141/65 |
| 5,449,079 A | * | 9/1995 | Yang | B65D 81/2038 141/65 |
| 5,465,857 A | * | 11/1995 | Yang | B65B 31/047 137/522 |
| 5,535,900 A | * | 7/1996 | Huang | B65B 31/047 137/522 |
| D422,459 S | | 4/2000 | Webb et al. | |
| 7,086,427 B2 | * | 8/2006 | Bonich | B65B 31/047 141/65 |
| D528,367 S | | 11/2006 | McFarlin | |
| 7,198,074 B2 | * | 4/2007 | Lemme | B65B 31/047 141/114 |

(Continued)

*Primary Examiner* — Nicolas A Arnett
(74) *Attorney, Agent, or Firm* — David Duckworth

(57) ABSTRACT

A wine bottle stopper is provided including a vacuum stopper and a removable decorative cap. The wine stopper includes an upper portion and a lower portion. A central conduit extends longitudinally through the vacuum stopper, and a one-way valve is located within the central conduit. The vacuum stopper has a bottom shaft sized for insertion into a wine bottle's opening. The vacuum stopper's upper portion extends exterior to the wine bottle. Meanwhile, the decorative cap has a sidewall and a top forming a central cavity sized to engage and cover the wine stopper's upper portion. Preferably, the decorative cap includes a decorative feature providing a pleasing appearance.

20 Claims, 6 Drawing Sheets

(56) References Cited

U.S. PATENT DOCUMENTS

| | | | |
|---|---|---|---|
| D658,985 S | | 5/2012 | Sadykov et al. |
| 8,276,625 B2 * | | 10/2012 | Dulst .................... B65B 31/042 |
| | | | 141/19 |
| 8,701,910 B1 * | | 4/2014 | Michalopoulos .. B65D 81/2038 |
| | | | 141/114 |
| 8,967,413 B2 * | | 3/2015 | Tinstman ................ B65B 31/04 |
| | | | 141/65 |
| 9,090,381 B2 | | 7/2015 | Yang |
| 9,370,791 B1 * | | 6/2016 | Nguyen ................ F04B 53/127 |
| 9,656,847 B2 * | | 5/2017 | Haley ...................... B67C 3/16 |
| 2005/0178094 A1 * | | 8/2005 | Brucart Bonich .... B65B 31/047 |
| | | | 53/510 |
| 2009/0122524 A1 | | 5/2009 | Yang |
| 2011/0126939 A1 * | | 6/2011 | Luis ..................... B65B 31/047 |
| | | | 141/65 |
| 2011/0220606 A1 * | | 9/2011 | Alipour ............. B65D 39/0064 |
| | | | 215/230 |
| 2013/0153685 A1 * | | 6/2013 | Michael J. ........... B01F 5/0428 |
| | | | 239/428.5 |
| 2014/0263453 A1 | | 9/2014 | Haley et al. |
| 2015/0259186 A1 * | | 9/2015 | Haley ...................... B67C 3/16 |
| | | | 53/432 |
| 2016/0039584 A1 | | 2/2016 | Verderber |
| 2016/0297597 A1 | | 10/2016 | Lee |
| 2019/0177054 A1 * | | 6/2019 | Duckworth ........... B65D 51/18 |

\* cited by examiner

VACUUM WINE BOTTLE STOPPER AND CAP, AND METHOD OF USE

BACKGROUND OF THE INVENTION

The present invention relates to a wine bottle stopper. More particularly, the present invention relates to a decorative vacuum wine stopper.

Wine is typically bottled in glass bottles having a narrow neck with a central opening. Once filled with wine, a wine bottle is typically sealed with a cork, synthetic cork, or screw top cap. After being bought, the wine bottle is opened by removing the cork or screw top cap. Once opened, air is capable of entering into the bottle which can affect the wine's properties. Typically, exposure of only a few hours is not significant and a small amount of oxygen can actually improve the properties of the wine. However, if the wine is not drunk within a few hours, oxygen from the air can have a harmful effect to the remaining wine. This is because the oxygen from the air which has entered the wine bottle will continue to alter the wine's properties over time even if the wine bottle has been sealed relatively rapidly. These harmful effects become more noticeable as time passes and can render the wine undrinkable.

Non-vacuum bottle stoppers have been known for a very long time. Though a bottle stopper may consist of a simple reused cork, very fanciful constructions have also been developed. Fanciful bottle stoppers are particularly desirable when a wine bottle is going to be conspicuously displayed on a countertop or bar after the initial portion of wine has been consumed. Examples of decorative wine bottle stoppers include that described in U.S. Pat. No. D658,985 which illustrates a wine stopper having a tree-shaped appendage, U.S. Pat. No. 3,009,594 which illustrates a decorative balloon construction, U.S. Patent Publication No. 2009/0122524 which includes a lighted snow globe appendage, and U.S. Pat. No. 9,090,381 which also includes an electrically lighted unit. Unfortunately, none of these decorative and fanciful constructions which might be considered pleasing to the eye will extend the life of the wine within the wine bottle.

Various constructions have been introduced to reduce the harmful effects of oxygen upon wine. For example, a wide variety of vacuum stoppers have been developed for sealing a wine bottle which also allows for the evacuation of air from the wine bottle's interior. A typical vacuum stopper includes a lower neck portion and an upper portion. The neck portion is typically cylindrical and sized for insertion into the circular opening of a wine bottle's neck. In addition, the neck portion typically includes ribs for providing a gaseous-type seal between the vacuum stopper's neck portion and the wine bottle's neck. Meanwhile, the vacuum stopper's upper portion typically has a shape which is too large to enter into the wine bottle's circular opening. In addition, the vacuum stopper includes a longitudinally extending conduit which extends entirely through the vacuum stopper's upper portion and lower portion. A one-way valve is located within the conduit which allows air to leave the wine bottle's interior, but not enter into the wine bottle. Once the wine bottle stopper's neck has been positioned within a wine bottle's circular opening, a pump is used to evacuate air from the wine bottle's interior.

Advantageously, vacuum wine stoppers can substantially extend the drinking life of the wine within a wine bottle. Disadvantageously, vacuum wine stoppers are typically ugly utilitarian constructions.

Thus, there exists a need for an improved vacuum wine stopper which has a pleasing appearance.

SUMMARY OF THE INVENTION

The present invention is directed to an improved wine bottle stopper for a wine bottle. The wine bottle stopper includes a traditional vacuum stopper and a removeable cap. The vacuum stopper is constructed in any manner as is readily available. To this end, the vacuum stopper includes both a neck portion and an upper portion which extends upwardly above the neck portion. A conduit extends longitudinally through the entire vacuum stopper's neck portion and upper portion. The one-way valve is located within the central conduit which freely permits the flow of air as received by the conduit at the bottom of the neck portion to be expelled from the top of the vacuum stopper's upper portion. The neck portion has a diameter capable of entering and providing a gaseous seal with a wine bottle's circular opening. Since a 750 ml wine bottle typically has a ¾ inch opening, it is preferred that the vacuum stopper's neck portion has a diameter of ¾ inch or slightly larger. For slightly larger wine bottles having openings of ⅞ inch or 15/16 inch openings, it is preferred that the vacuum stopper's neck portion is sized accordingly to have a neck portion of the same diameter or slightly larger so as to form a gaseous-tight seal. Meanwhile, the vacuum stopper's upper portion is sized so as to be too large so as to enter into the bottle's circular opening. The upper portion may have a round or square shape, and includes a laterally extending rim having a diameter, or other dimensions, too large to enter into the bottle's circular opening.

The removable cap is sized for engaging and covering the vacuum stopper's upper portion. To this end, the cap has a top and a sidewall which extends downwardly from the cap's top. The cap's top and sidewall form a central cavity which is sized to entirely accept the vacuum stopper's upper portion. In addition, the cap's sidewall is sized and shaped to form a press-fit engagement with the vacuum stopper's upper portion's rim. In a first embodiment, the cap's height is sufficient so that when the cap is placed upon a vacuum stopper, the cap's sidewall covers the vacuum stopper's rim without extending below the rim. In an alternative embodiment, the cap's cavity and corresponding sidewall are sized to receive the vacuum stopper's upper portion with the cap's sidewall extending downwardly below the rim so as to partially cover the top of a wine bottle.

After a wine bottle has been opened by removing its cork or twist cap, a vacuum stopper is inserted into the wine bottle's circular opening. This is accomplished by inserting the vacuum stopper's neck portion into the wine bottle's circular opening until the vacuum stopper's upper portion engages the wine bottle's circular opening. A pump is connected to the vacuum stopper's upper portion and operated to evacuate air from the wine bottle's interior. Once the pump is removed from the vacuum stopper's upper portion, the one-way valve and gaseous-tight seal between the vacuum stopper's neck portion and wine bottle's neck prevents air from unwantingly entering into the wine bottle's chamber. Thereafter, the removable cap is placed upon the vacuum stopper's upper portion so as to completely encapsulate it.

To access the wine again, these steps are simply reversed. The removeable cap is pulled from the top of the vacuum stopper's upper portion. Thereafter, the vacuum stopper is pulled from the wine bottle's neck. The vacuum stopper may or may not include a trigger or button for deactivating the one-way valve to allow entry of air into the wine bottle to facilitate the removal of the vacuum stopper from the wine bottle.

Advantageously, the removable cap may incorporate a wide variety of decorative features including fanciful colors and decorative shapes to provide an infinite number of artistic creations all of which will completely cover the unattractive vacuum stopper which extends from the top of the wine bottle. Various modifications of the vacuum stopper and wine bottle combination can be made. For example, the vacuum stopper's rim and removable cap's sidewall may be circular. Alternatively, the vacuum stopper's upper portion may be constructed in various shapes such as a square such as to accept a removeable cap having a square sidewall. In an additional preferred embodiment, the vacuum stopper's rim and removeable cap's sidewall are sized and shaped to provide a gaseous-tight seal so as to provide an extra level of protection against unwanted air entering into a wine bottle's interior.

Advantageously, the vacuum stopper and decorative cap provide a more pleasing appearance as well as a redundant gaseous seal.

Other features and advantages of the present invention will be appreciated by those skilled in the art upon reading the detailed description which follows with reference to the attached drawings.

DETAILED DESCRIPTION OF THE INVENTION

Figure 1:
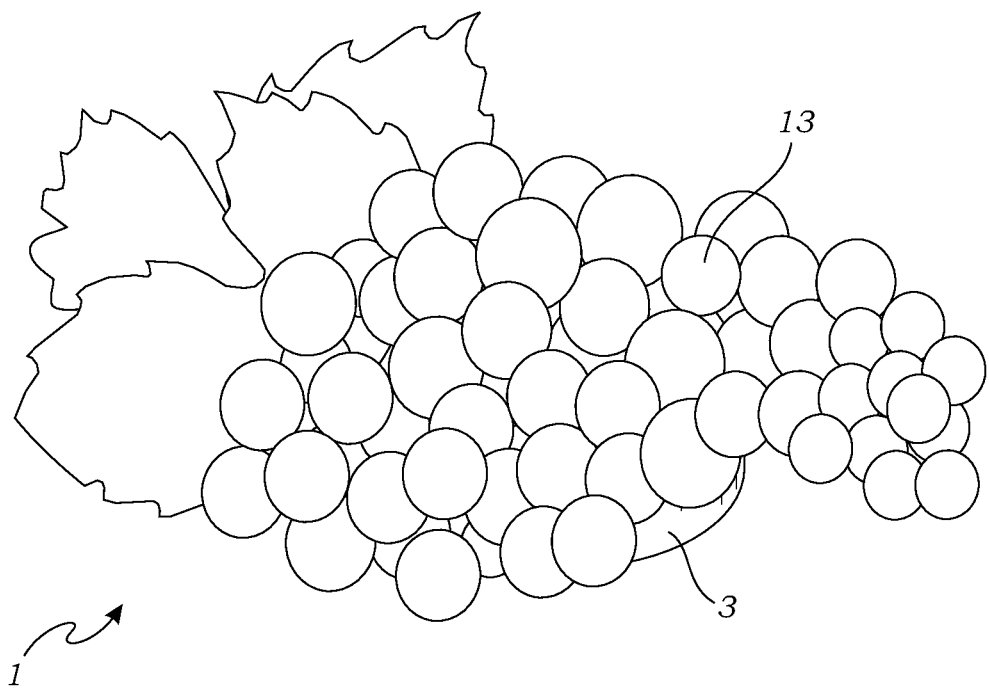
FIG. 1 is a top perspective view of a removable cap for engaging and covering a vacuum stopper of the present invention.
Figure 2:
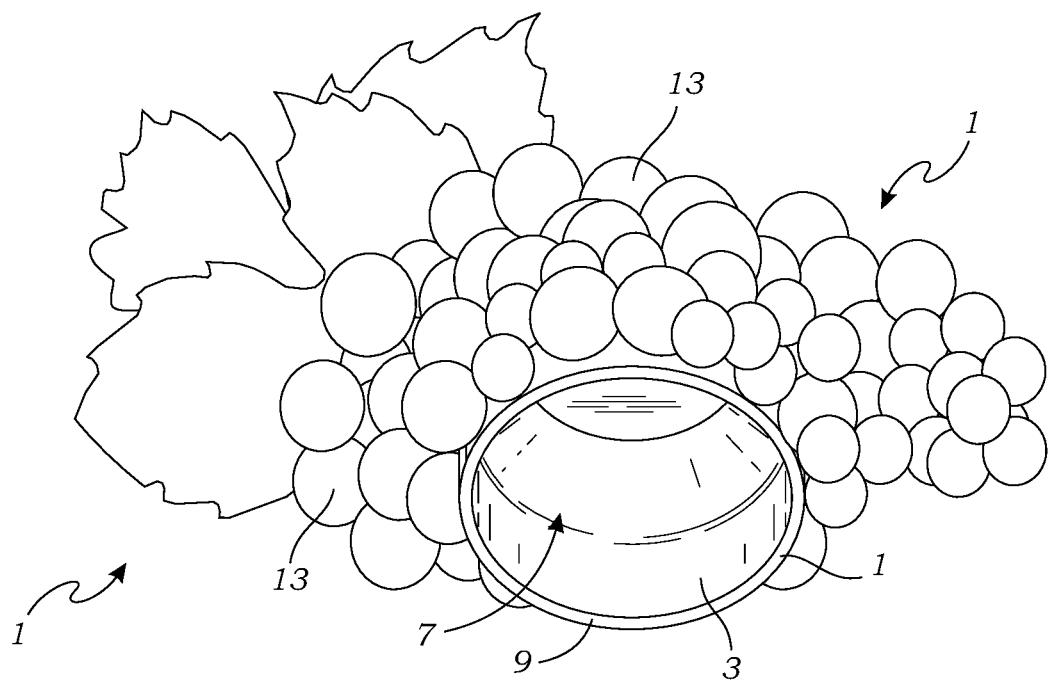
FIG. 2 is a bottom perspective view of a removeable cap for engaging and covering a vacuum stopper of the present invention.
Figures 3, 4, 5:
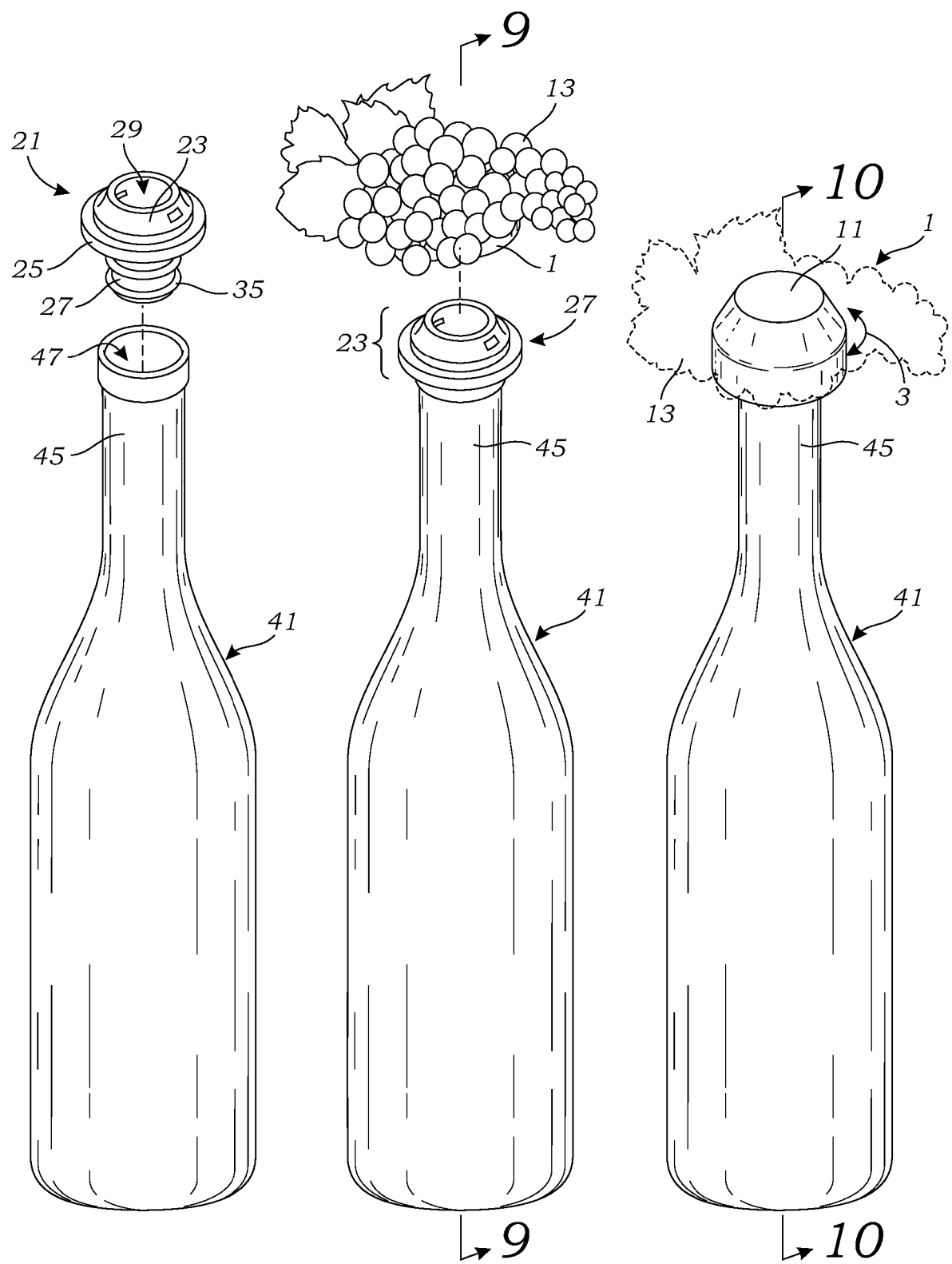
FIG. 3 is a perspective view illustrating insertion of a vacuum stopper into a wine bottle's circular opening.
FIG. 4 is a perspective view illustrating a vacuum stopper within a wine bottle, and application of a removeable cap upon the vacuum stopper.
FIG. 5 is a perspective view illustrating a removeable cap upon a vacuum stopper which has been inserted into a wine bottle's circular opening.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

With reference to FIGS. 1-16, the assembly for sealing a wine bottle 41 includes a vacuum wine stopper 21 and a removeable cap 1. With reference to FIGS. 3-10, the vacuum stopper 21 is preferably of a traditional construction including an upper portion 23 and a bottom neck portion 27. A central conduit 29 extends longitudinally from the bottom of the shaft portion 27 to the top of the upper portion 23. In addition, the vacuum stopper 21 includes a one-way valve 33 located within the central conduit 29 which is intended to allow air to escape from the interior of a wine bottle 41 to be expelled through one or more outlets 31 at the top of the vacuum stopper 21. The wine stopper's neck portion 27 is sized to enter a wine bottle's circular opening 47 and form a press-fit engagement with the wine bottle at the wine bottle's neck 45. The diameter of the vacuum stopper's shaft 27 may be any size so as to form a press-fit engagement with a wine bottle's opening 47. Preferably, the vacuum stopper's neck portion 27 includes one or more circular ribs 35 which radially project from the neck portion 27 to provide additional engagement with the interior of the bottle's neck 45. For example, the opening of a standard 750 ml wine bottle is ¾ of an inch, and thus a preferred diameter of the wine bottle's neck portion is preferably approximately ¾ of an inch or slightly larger. Similarly, for wine bottles with larger openings, such as typically accepting a size #8 or size #9 cork, preferably has a ⅞ inch diameter or 15/16 inch diameter, or slightly larger. Of course, wine bottles with either smaller or larger openings 47 would preferably accept a vacuum wine stopper 21 with correspondingly smaller or larger diameter neck portions 27.

Figures 15, 16:
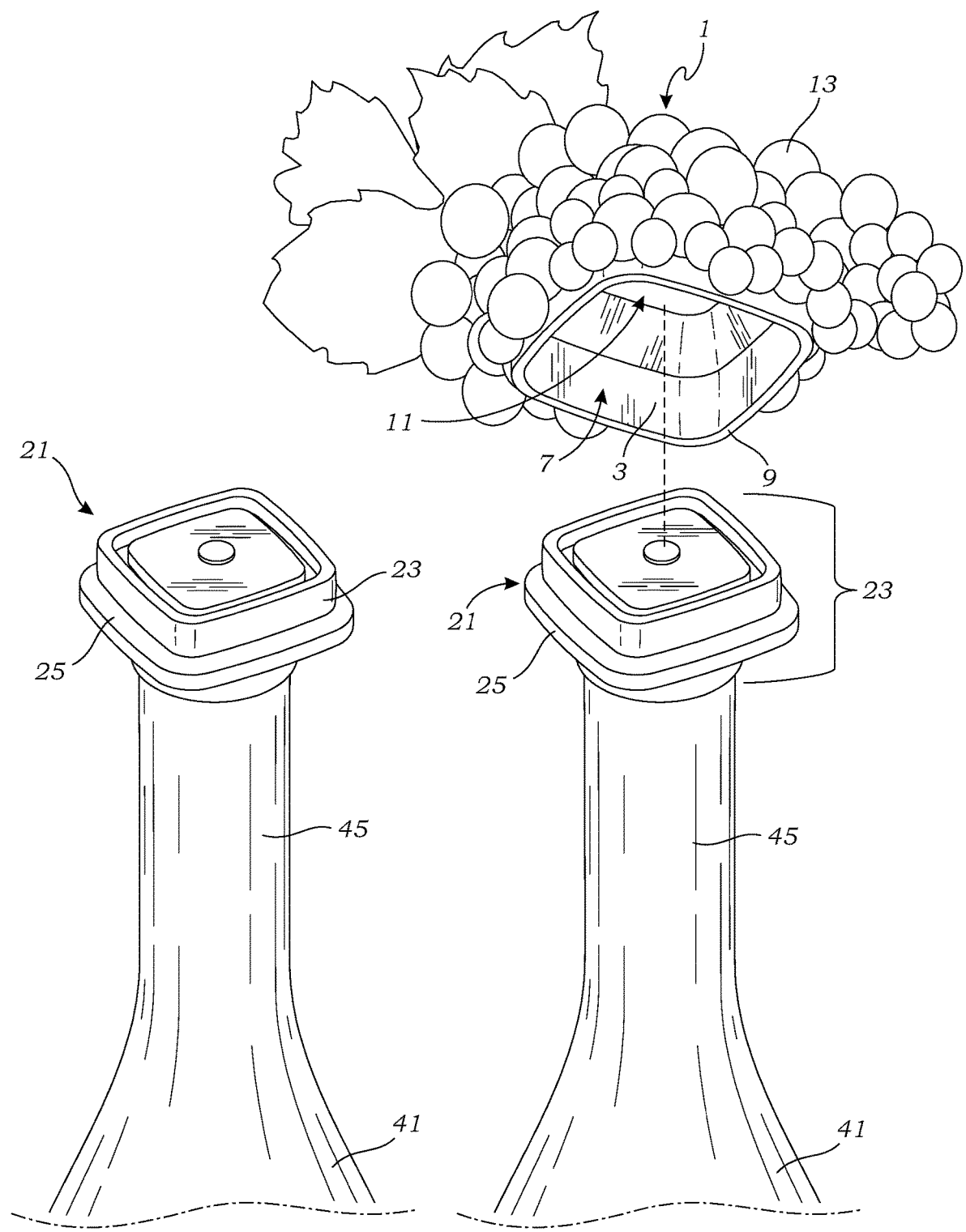
FIG. 15 is a top perspective view illustrating a vacuum stopper having a square rim wherein the vacuum stopper's neck portion has been inserted into a wine bottle's circular opening.
FIG. 16 is a perspective view illustrating the vacuum stopper and wine bottle illustrated in FIG. 15 with a removeable cap about to be applied to engage and cover the vacuum stopper's upper portion.

With reference to FIGS. 3-10, the vacuum wine stopper has an upper portion 23 having a diameter too large to enter into the wine bottle's opening 47. As illustrated in the Figures, the vacuum stopper's upper portion 23 includes a rim 25 which extends radially beyond the wine bottle's opening 47 for preventing the vacuum stopper's upper portion 23 from inadvertently entering into the bottle's neck 45. Preferably, the bottom of the rim 25 also provides a gaseous-tight seal where it engages the top of the wine bottle 41. The vacuum stopper's upper portion 23 and corresponding rim 25 can take various shapes and forms as can be determined by those skilled in the art. As illustrated in FIGS. 3-10, a preferred embodiment of the vacuum stopper's upper portion 23 has a round shape. However, as illustrated in FIGS. 15 and 16, the upper portion can take any number of shapes including square.

With reference to FIGS. 1, 2, 4, 5 and 11-14, the wine bottle stopper of the present invention includes a removeable cap 1 includes a top 11 and a sidewall 3 forming a cavity 7. The removable cap's sidewall 3 and cavity 7 are sized to entirely accept the vacuum stopper's neck portion 23 within the decorative cap's cavity 7. Accordingly, with reference to FIGS. 9 and 10, preferably the removeable cap's sidewall 3 is dimensioned so as to accept in a press fit manner the upper portion's rim 25. Furthermore, preferably the removable cap's sidewall has a height 8 sufficient to entirely cover the vacuum stopper's neck portion's rim 25. In the first embodiment not illustrated in the Figures, when the removeable cap 1 is mated to the vacuum stopper 21, the removable cap's sidewall 3 has a height 8 sufficient to cover the vacuum stopper's upper portion's rim without extending below the rim 25. In the alternative embodiments illustrated in FIG. 10, the decorative cap's sidewall has a height 8 so that the sidewall's bottom edge 9 extends below the vacuum stopper's rim 25 so as to cover the top of a wine bottle. In addition, in a preferred embodiment illustrated in FIG. 10, the removable cap's sidewall 3 is sized to provide a gaseous-tight seal with the vacuum stopper's upper portion's rim 25 so as to provide a redundant gaseous-tight seal to the one-way valve 33. The removable cap 1 may be made of any material known to those skilled in the art. However, preferably the removeable cap's top and sidewall are made from metal, stone, glass, plastic or rubber so as to have at least some rigidity so as to maintain a press fit engagement within the underlying vacuum stopper.

As illustrated in FIGS. 1, 2, 4 and 9-14, preferably the removeable cap 1 includes a decorative feature 13. The decorative feature can be any shape, size or color. However, it is preferred that the decorative feature 13 provide an artistic and pleasing appearance so that the wine bottle can be displayed prominently even after the wine bottle has been opened. For example, in a preferred embodiment illustrated in FIGS. 1, 2 and 4, the removeable cap's decorative feature 13 consists of a sculpture of grapes. Alternative embodiments illustrated in FIGS. 11-14 include a sports theme, Christmas tree, birthday cake and animal figurines.

Figure 6:
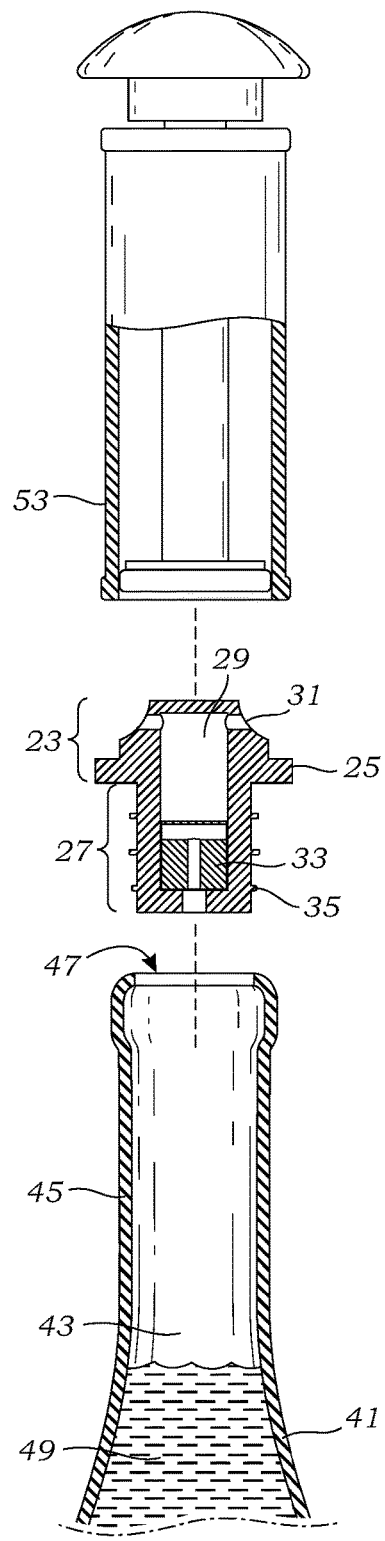
FIG. 6 is a side cross-sectional view illustrating insertion of a vacuum stopper into a wine bottle.
Figure 7:
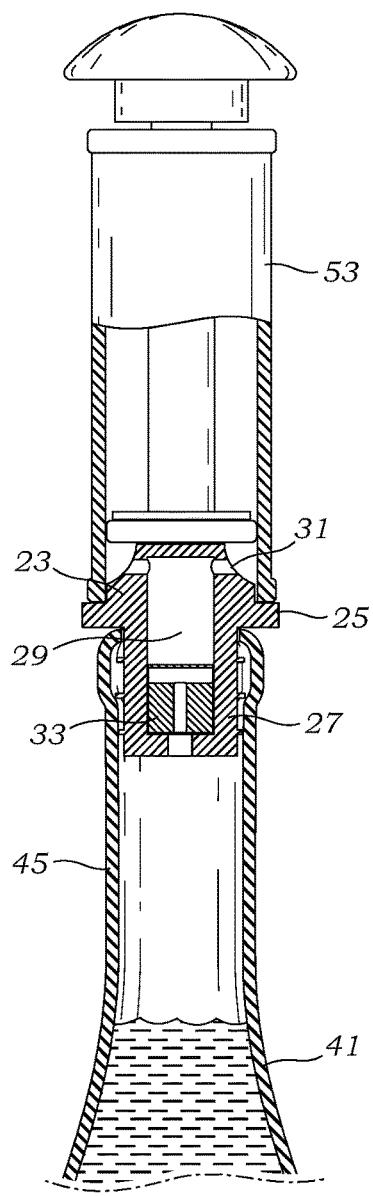
FIG. 7 is a side cross-sectional view illustrating a pump engaging a vacuum stopper within a wine bottle.
Figure 8:
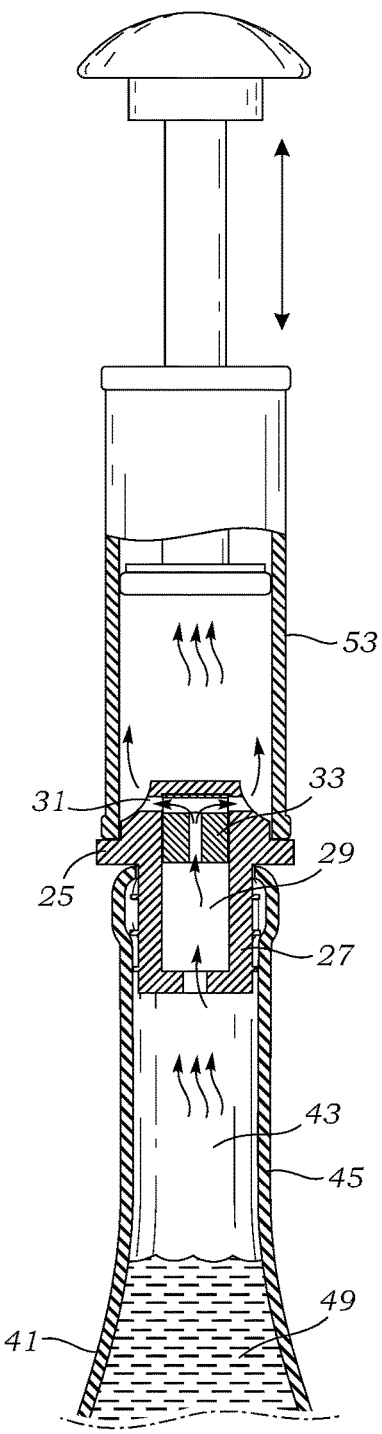
FIG. 8 is a side cross-sectional view illustrating activation of the pump so as to remove air from the wine bottle illustrated in FIG. 7.
Figure 9:
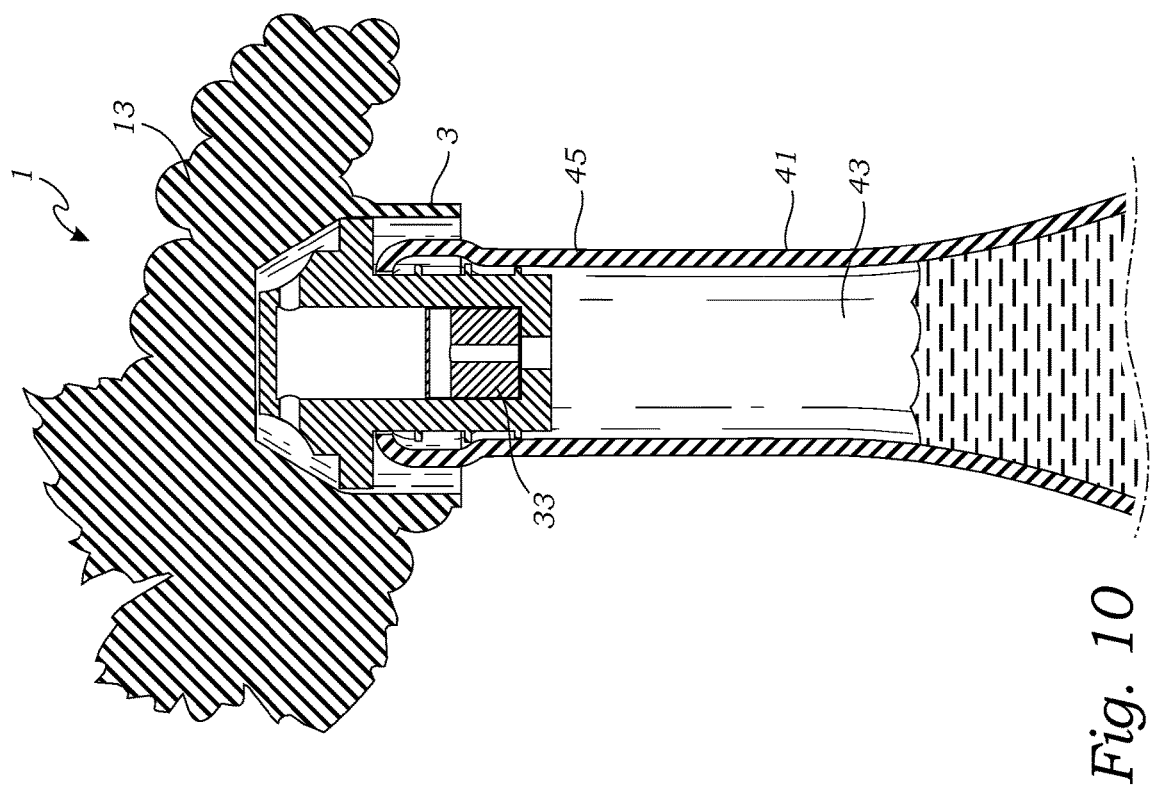
FIG. 9 is a side cross-sectional view illustrating a removable cap being applied to the upper portion of a vacuum stopper which has already been inserted into a wine bottle.
Figure 10:
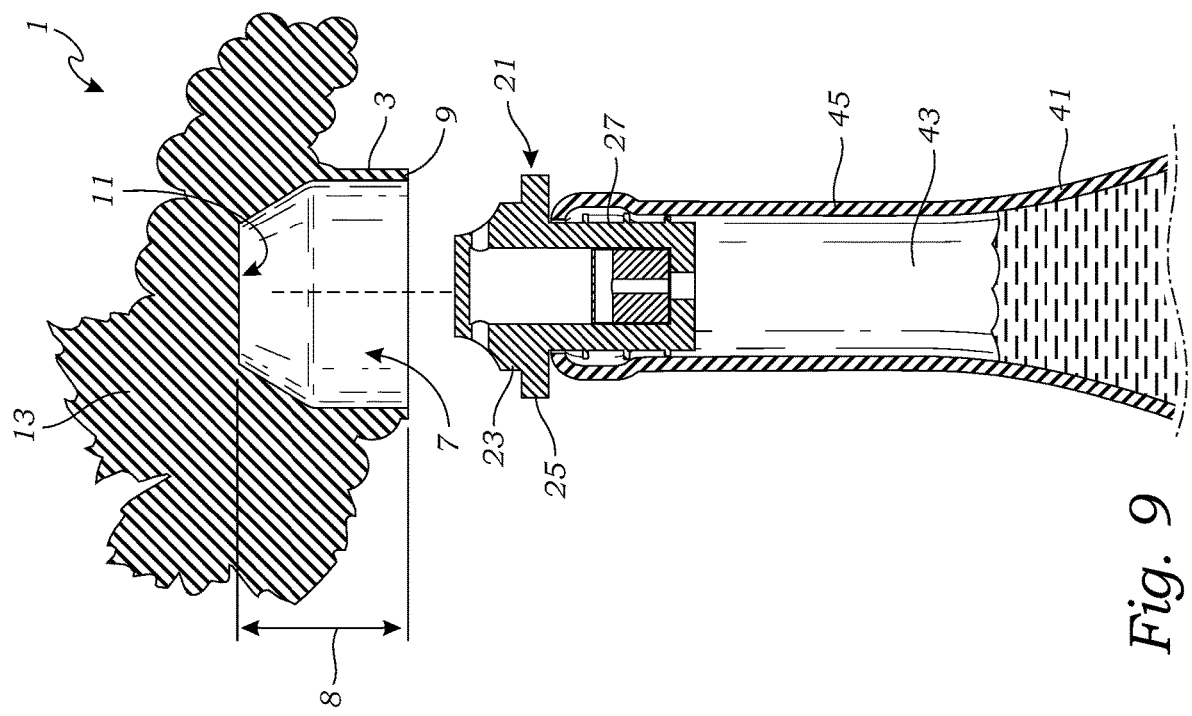
FIG. 10 is a side cross-sectional view illustrating a removable cap engaging and covering a vacuum stopper within a wine bottle.
Figure 11:
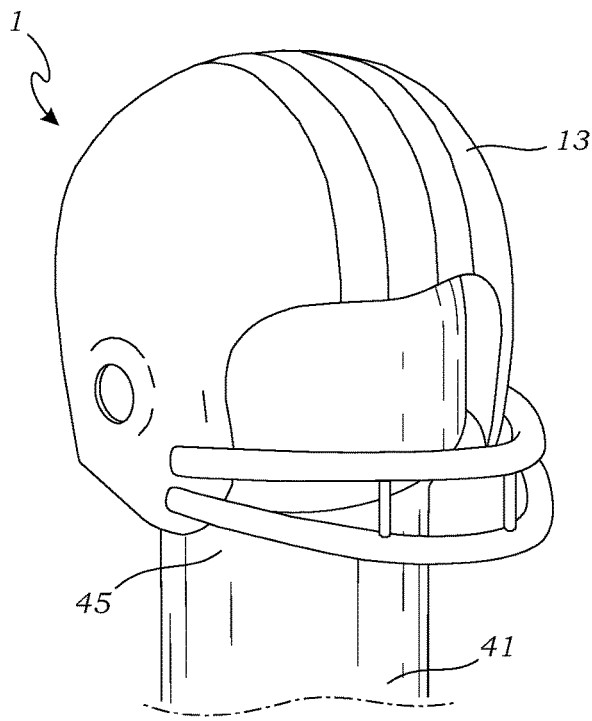
FIG. 11 is a perspective view illustrating an alternative embodiment of a removeable cap engaging in covering a vacuum stopper's upper portion.
Figure 12:
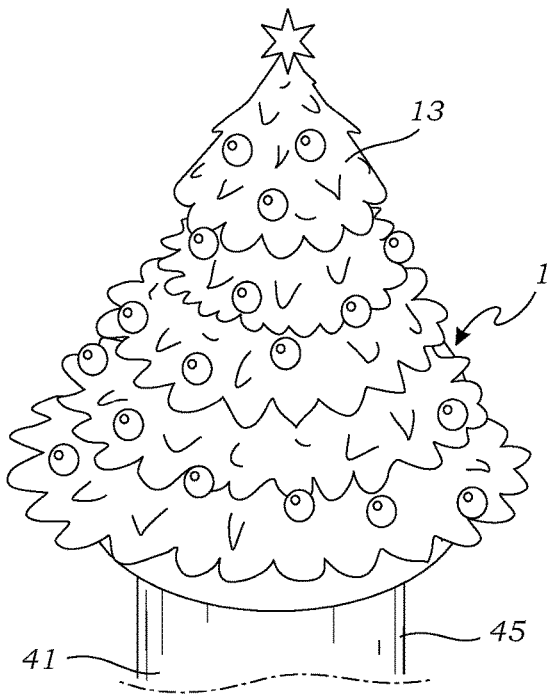
FIG. 12 is still an additional embodiment of the removeable cap in engaging in covering a vacuum stopper's upper portion.
Figure 13:
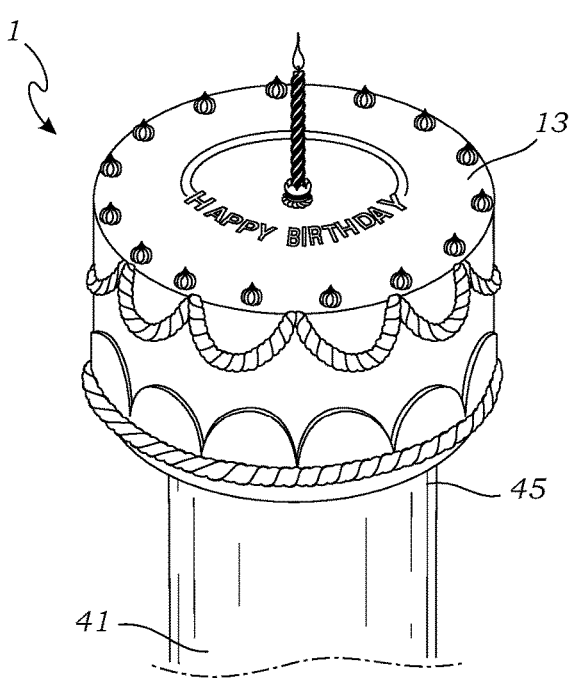
FIG. 13 is still an additional embodiment of the removeable cap in engaging in covering a vacuum stopper's upper portion.
Figure 14:
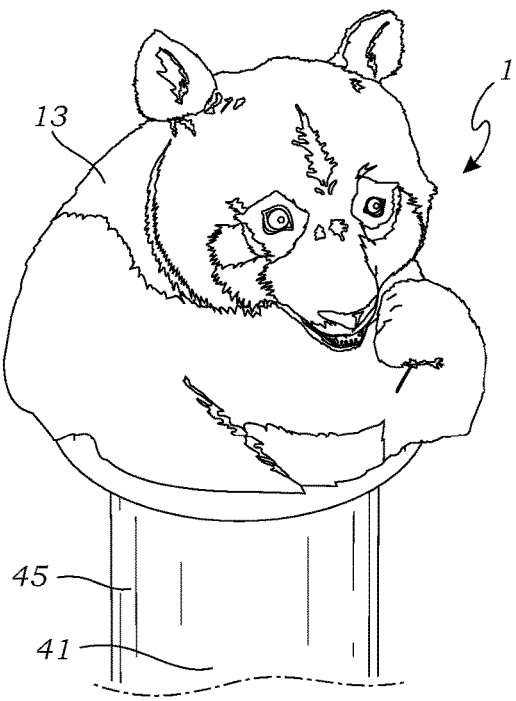
FIG. 14 is still an additional embodiment of the removeable cap in engaging in covering a vacuum stopper's upper portion.

As illustrated in FIGS. 6-7, the vacuum wine stopper 21 and removeable cap 1 are used in combination to seal an opened bottle of wine 41. As illustrated in FIG. 6, first the vacuum stopper's neck 27 is inserted into the bottle's opening 47. As illustrated in FIGS. 7 and 8, a pump 53 is utilized to evacuate air from the interior of the wine bottle. This is accomplished by engaging the pump's bottom edge to the vacuum stopper's rim 25 to provide a gaseous-tight seal. (See FIG. 7). Thereafter, the pump is actuated so as to pull air from the wine bottle through the vacuum stopper's central conduit 29 pass the vacuum stopper's one-way valve 33. (See FIG. 8). Once the air is evacuated, the pump 53 is removed and, as illustrated in FIGS. 9 and 10, the removeable cap 1 is then placed atop the vacuum stopper 21. To access the wine, these steps are reversed. The removeable cap 1 is removed from the vacuum stopper 21, and the vacuum stopper is withdrawn from the wine bottle's opening 47.

While several particular forms of the invention have been illustrated and described, it will be apparent that various modifications can be made without departing from the spirit and scope of the invention. Accordingly, it is not intended that the invention be limited except by the following claims.

I claim:

1. A wine bottle stopper for a wine bottle comprising:
   a vacuum stopper including a neck portion, an upper portion extending above said neck portion, a conduit extending longitudinally through said neck portion and said upper portion, and a one-way valve located within said conduit which freely permits air to flow upwardly through said conduit but inhibits air from flowing downwardly through said conduit, said neck portion having a diameter for entering and providing a seal with a bottle's circular opening, said upper portion having a longitudinally extending height and a laterally extending rim which is too large to enter into a bottle's circular opening; and
   a removeable cap for engaging and covering said vacuum stopper's upper portion, said cap having a top and a sidewall forming a central cavity, said cavity sized and having a height to entirely accept said vacuum stopper's upper portion including said rim in said cavity, and said cavity sized so that said cap's sidewall can form a press fit engagement with said vacuum stopper upper portion's rim.

2. The wine bottle stopper for a wine bottle of claim 1 further comprising a decorative feature upon the exterior of said cap.

3. The wine bottle stopper for a wine bottle of claim 1 wherein said vacuum stopper's rim is round and said removable cap's sidewall is circular.

4. The wine bottle stopper for a wine bottle of claim 1 wherein said vacuum stopper's rim is square and said removable cap's sidewall is square.

5. The wine bottle stopper for a wine bottle of claim 1 wherein said vacuum stopper's rim and said removable cap's sidewall are sized and shaped to provide a gaseous tight seal between them.

6. The wine bottle stopper for a wine bottle of claim 1 wherein said removable cap's cavity is sized to accept and cover said vacuum stopper's upper portion including its rim without said cap's sidewall extending below said rim.

7. The wine bottle stopper for a wine bottle of claim 1 wherein said removable cap's cavity is sized to accept and cover said vacuum stopper's upper portion including its rim with said cap's sidewall extending below said rim.

8. A wine bottle, vacuum stopper and removeable cap combination comprising:
   a bottle having a chamber and a neck with a circular opening;
   a vacuum stopper including a neck portion, an upper portion extending above said neck portion, a conduit extending longitudinally through said neck portion and said upper portion, and a one-way valve located within said conduit which freely permits air to flow upwardly through said conduit but inhibits air from flowing downwardly through said conduit, said neck portion positioned within and providing a seal with said bottle's circular opening, said upper portion having a longitudinally extending height which forms the portion of the vacuum stopper which is exterior of said bottle's neck and a laterally extending rim which is too large to enter into said bottle's circular opening; and
   a removeable cap for covering said vacuum stopper's upper portion, said cap having a top and a sidewall forming a central cavity, said cavity sized and having a height to entirely accept said vacuum stopper's upper portion in said cavity, and said cavity sized so that said cap's sidewall can form a press fit engagement with said vacuum stopper upper portion's rim; and wherein said vacuum stopper's neck portion is positioned within said bottle's neck, and said vacuum stopper's upper portion including rim is within and completely covered by said removeable cap.

9. The wine bottle, vacuum stopper and removeable cap combination of claim 8 further comprising a decorative feature upon the exterior of said cap.

10. The wine bottle, vacuum stopper and removeable cap combination of claim 8 wherein said vacuum stopper's rim is round and said removable cap's sidewall is circular.

11. The wine bottle, vacuum stopper and removeable cap combination of claim 8 wherein said vacuum stopper's rim is square and said removable cap's sidewall is square.

12. The wine bottle, vacuum stopper and removeable cap combination of claim 8 wherein said vacuum stopper's rim and said removable cap's sidewall are sized and shaped to provide a gaseous tight seal between them.

13. The wine bottle, vacuum stopper and removeable cap combination of claim 8 wherein said removable cap's cavity is sized to accept and cover said vacuum stopper's upper portion including its rim without said cap's sidewall extending below said rim.

14. The wine bottle, vacuum stopper and removeable cap combination of claim 8 wherein said removable cap's cavity is sized to accept and cover said vacuum stopper's upper portion including its rim with said cap's sidewall extending below said rim so as to partially cover said wine bottle's neck.

15. A method of evacuating and storing wine in a wine bottle comprising the steps of:
- providing a bottle having a chamber partially filled wine, said bottle having and a neck with a circular opening;
- providing a vacuum stopper including a neck portion, an upper portion extending above said neck portion, a conduit extending longitudinally through said neck portion and said upper portion, and a one-way valve located within said conduit which freely permits air to flow upwardly through said conduit but inhibits air from flowing downwardly through said conduit, said neck portion positioned within and providing a seal with said bottle's circular opening, said upper portion having a longitudinally extending height and a laterally extending rim which is too large to enter into said bottle's circular opening;
- providing a removeable cap for covering said vacuum stopper's upper portion, said cap having a top and a sidewall forming a central cavity, said cavity sized and having a height to entirely accept said vacuum stopper's upper portion in said cavity, and said cavity sized so that said cap's sidewall can form a press fit engagement with said vacuum stopper upper portion's rim;
- providing a pump capable of pumping air through vacuum stopper's conduit;
- positioning said vacuum stopper's neck portion through said circular opening within said wine bottle's neck to form a gaseous seal between said vacuum stopper and said wine bottle's neck, said vacuum stopper's upper portion extending longitudinally exterior of said bottle's neck;
- evacuating air from said bottle by pumping air through vacuum stopper's conduit; and
- completely covering said vacuum stopper's upper portion including rim with said removeable cap by placing said removeable cap upon said vacuum stopper's upper portion.

16. The method of evacuating and storing wine in a wine bottle of claim 15 further comprising a decorative feature upon the exterior of said cap.

17. The method of evacuating and storing wine in a wine bottle of claim 15 wherein said vacuum stopper's rim is round and said removable cap's sidewall is circular.

18. The method of evacuating and storing wine in a wine bottle of claim 15 wherein said vacuum stopper's rim and said removable cap's sidewall are sized and shaped to provide a gaseous tight seal between them.

19. The method of evacuating and storing wine in a wine bottle of claim 15 wherein said removable cap's cavity is sized to accept and cover said vacuum stopper's upper portion including its rim without said cap's sidewall extending below said rim.

20. The method of evacuating and storing wine in a wine bottle of claim 15 wherein said removable cap's cavity is sized to accept and cover said vacuum stopper's upper portion including its rim with said cap's sidewall extending below said rim so as to partially cover said wine bottle's neck.

* * * * *